(12) United States Patent
Womack et al.

(10) Patent No.: US 12,132,804 B2
(45) Date of Patent: Oct. 29, 2024

(54) RUNTIME MODULE CONVERSION

(71) Applicant: ServiceNow, Inc., Santa Clara, CA (US)

(72) Inventors: James Joshua Womack, San Diego, CA (US); Kai Guo, San Diego, CA (US); Richard Allan Bull, San Diego, CA (US); Rodrigo Oliveira Fernandez, San Marcos, CA (US)

(73) Assignee: ServiceNow, Inc., Santa Clara, CA (US)

(*) Notice: Subject to any disclaimer, the term of this patent is extended or adjusted under 35 U.S.C. 154(b) by 51 days.

(21) Appl. No.: 17/591,272

(22) Filed: Feb. 2, 2022

(65) Prior Publication Data

US 2023/0247111 A1    Aug. 3, 2023

(51) Int. Cl.
*H04L 67/5683* (2022.01)
*G06F 8/65* (2018.01)
*H04L 67/02* (2022.01)
*H04L 67/1097* (2022.01)

(52) U.S. Cl.
CPC ............ *H04L 67/5683* (2022.05); *G06F 8/65* (2013.01); *H04L 67/02* (2013.01); *H04L 67/1097* (2013.01)

(58) Field of Classification Search
CPC . H04L 67/5683; H04L 67/02; H04L 67/1097; G06F 8/65
USPC ........................................................ 709/203
See application file for complete search history.

(56) References Cited

U.S. PATENT DOCUMENTS

| | | | |
|---|---|---|---|
| 6,321,229 B1 | 11/2001 | Goldman | |
| 6,678,887 B1 | 1/2004 | Hallman | |
| 7,020,706 B2 | 3/2006 | Cates | |
| 8,151,261 B2 | 4/2012 | Sirota | |
| 8,645,456 B2* | 2/2014 | Li | H04L 67/306 709/202 |
| 8,646,093 B2 | 2/2014 | Myers | |
| 8,983,982 B2 | 3/2015 | Rangarajan | |
| 9,065,783 B2 | 6/2015 | Ding | |
| 9,122,552 B2 | 9/2015 | Whitney | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 2005/0080880 A1* | 4/2005 | von Tetzchner | H04M 1/72445 709/219 |
| 2005/0267935 A1* | 12/2005 | Gandhi | H04L 67/125 709/203 |
| 2009/0083714 A1* | 3/2009 | Kiciman | G06F 8/658 717/128 |
| 2022/0283805 A1* | 9/2022 | Dasa | H04L 67/1097 |

* cited by examiner

*Primary Examiner* — Abdulkader M Alriyashi
(74) *Attorney, Agent, or Firm* — Fletcher Yoder, PC

(57) ABSTRACT

An asset, such as a module, may be used to provide access to a resource. The asset may include identifiers that indicate a type, version, or format of the asset. At least in some instances, an enterprise may desire to store and maintain assets of a particular type. Accordingly, the assets may be converted subsequent to receiving a request for the resource for which the asset is used to provide access. The converted assets may be output to a cache memory of a device attempting to access the resource and/or saved on a database to provide to additional computing devices attempting to access the resource.

20 Claims, 5 Drawing Sheets

RUNTIME MODULE CONVERSION

BACKGROUND

The present disclosure relates generally to techniques for maintaining and modifying versions, formats, or types of assets used in accessing resources, such as webpages, based on asset identifiers of the assets.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

As part of performing these core functions, enterprises may develop and/or maintain assets, such as software modules, to enable employees or customers to access certain resources, such as webpages or websites. If the software module is updated, or it becomes desirable to change a format or type of software module used by the enterprise, it may be difficult for the enterprise to organize implementation of a desired version of the software module or to convert the software module to a desired format or type due to the volume of software modules utilized by the enterprise.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Accordingly, the module conversion system discussed herein may improve the efficiency of certain operations related to the conversion and dissemination of assets used for providing access to certain resources. For example, the asset conversion system may receive a request from a computing device attempting to access a resource, such as a webpage. The asset conversion system may determine one or more software modules used for providing access to the resource. As referred to herein, the software modules (also referred to as "modules" herein) may include components executable by a processor, such as objects, functions, classes, or code. Additionally, the asset conversion system may determine whether the one or more modules used for providing access to a webpage (e.g., providing access to content presented on the webpage) corresponds to a particular type, version, or format of module using asset identifiers (e.g., asset type identifiers, asset version identifiers, and asset format identifiers) of the asset, such as metadata (e.g., patterns or strings) that indicate the type, version, or format. As used herein, the term "metadata" may be understood to correspond not to the content data or primary data being requested, but instead to secondary or informational data about this content or primary data or the creation or storage of the content or primary data, such as, but not limited to: type of file format, data or data file version, data or data file format, last update date, creation date, data related to current, recent or original user, and so forth. For example, the asset conversion system may determine whether the module corresponds to a first type, version, or format of software module (e.g., an older, outdated, or previous type of module) or a second type, version, or format having a desired type, version, or format. Accordingly, if the module corresponds to the first type, the asset conversion system may convert the module to a second type of module, such as by changing functions or commands within the code to functions or commands associated with the second type of module. In this way, modules utilized for running webpages may be updated "on the fly" or during run-time, as opposed to during other periods of time such as during build time. It is presently recognized updating modules in accordance with present disclosure may require less coordination across multiple users of the enterprise. Additionally, the updating the modules in this manner may reduce a likelihood that mismatched version of a build is provided to users (e.g., the user that trigger the request for opening the webpage). Moreover, updating the modules during the run time may enable communication between outdated or older versions of components or resources with newer components or resources, thereby improving the operation and/or efficiency of computing devices both providing or executing the modules in question.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
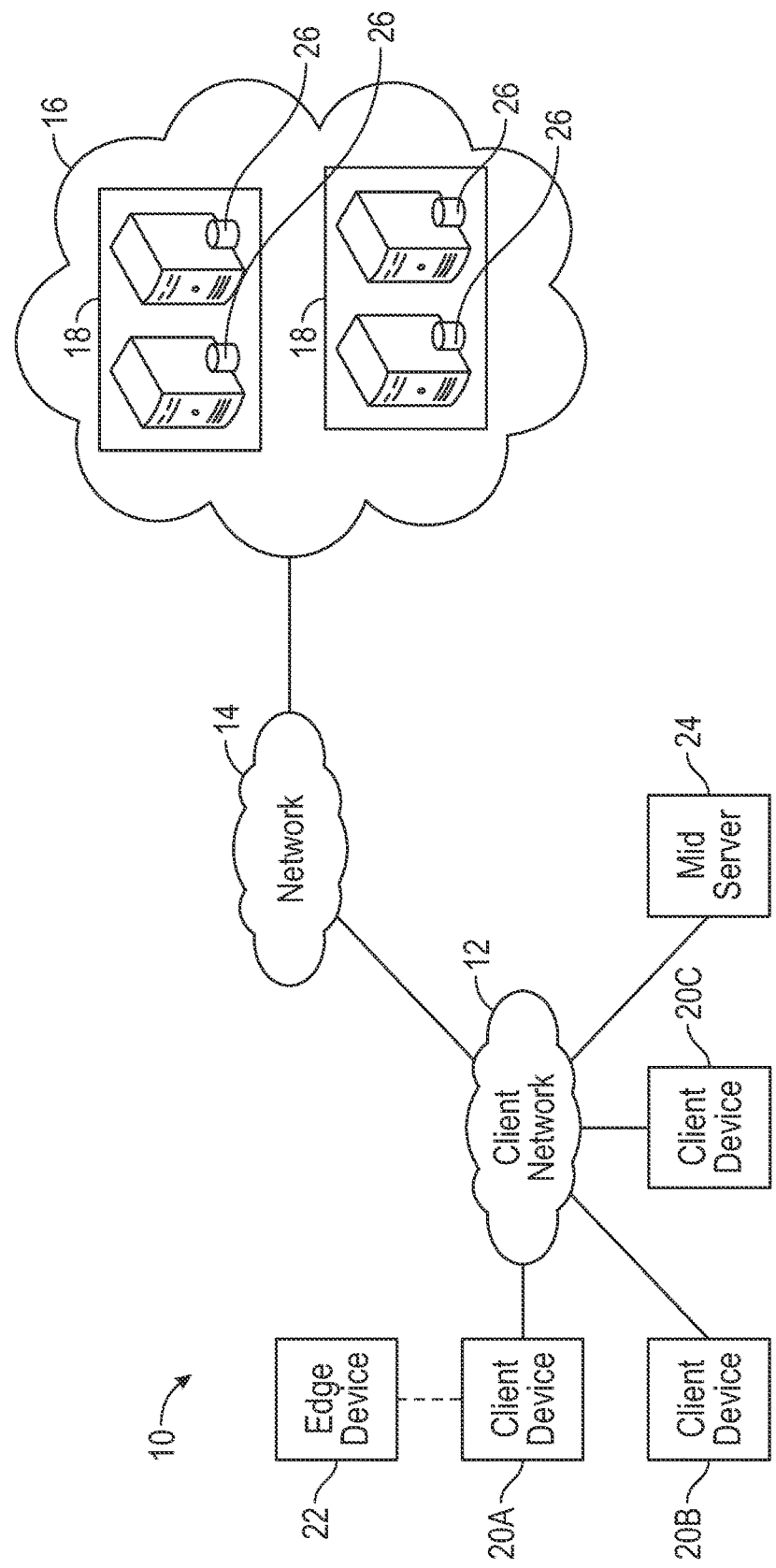
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "software module" and "module" refers to code or a file executable by a computing system. As referred to herein, the term "metadata" refers to data that may provide information about another piece of data, such as an indication of an author, a creation data, a modified date, and/or a file size.

As generally discussed herein, an enterprise or organization may manage a website having one or more webpages. For example, the enterprise or organization may include multiple employees or teams of employees who develop assets that provide access of portions of a website (e.g., content displayed on one or more webpages) to users accessing the website via an internet browser running on a computing device. Managing types, versions, or formats of the assets may be difficult as there may be a relatively large number of assets or versions of the asset. For example, in an example when an enterprise may desire to convert one or more assets of a first type or format to a second type, it may be an inefficient utilization of computational resources to reconfigure, rebuild, and redeploy each asset of the enterprise, some of which may be rarely or sporadically used or even decommissioned. As another non-limiting example, there may be multiple groups or employees developing an asset in parallel and, as such, it may be difficult to manage multiple versions of the asset each being concurrently developed by a respective group or employee who may be working separately on different portions of the asset (e.g., software module or code).

Accordingly, the present disclosure is directed to an asset conversion system (e.g., module conversion system) that manages asset types, versions, or formats in a progressive manner. In general, the disclosed asset conversion system may generally make a determination to convert an asset (e.g., a software module such as a Java module and/or web resource such as cascading style sheet (CSS) files, images, fonts, and the like), thereby generating a new asset (e.g., an updated software module), after receiving a request to access a resource (e.g., a webpage or website) that utilizes the asset to run the resource. For example, in response to a user accessing a website, a page processor associated with a web server of the webpage may determine one or more software modules utilized to run the webpage. Additionally, the page processor may determine whether the one or more modules correspond to a first type or a second type of module that is desirable to use in certain implementations. For example, a first type (e.g., version) of software module may operate more efficiently than a second type (e.g., version) of software module based on certain system configurations, such as operating system version, available processor bandwidth, available memory or storage, available network speed or bandwidth, and so forth. For example, the asset having a first type may be an ECMAScript (ESM) module and it may be desirable to convert the asset to a Universal Module Definition (UMD) module. In some embodiments, the disclosed asset conversion system may identify asset type identifiers (e.g., ATIs) of the asset (e.g., a pattern of strings in a line of code indicating a type, version or format) and determine whether the ATI(s) correspond to the characteristic identifiers of a first asset type or a second asset type (e.g., the desired module type). If the ATIs correspond to characteristic asset type identifiers of the first type (i.e., indicating that the type of the module is not the desired type of module), the disclosed asset conversion system may convert the module, such as by changing, altering, or modifying functions within the code from the first type to the second type. By converting the module based on requests received to access webpages that utilize the modules, the disclosed asset conversion system may enable a progressive rebuild of assets, which may provide a more efficient utilization of computational resources. Further, at least in some instances, the disclosed asset conversion system may store the converted module in a database, thereby maintaining and/or expanding a system that utilizes the desired type of modules so as to reduce acts of re-executing an update process or step that has previously been performed.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
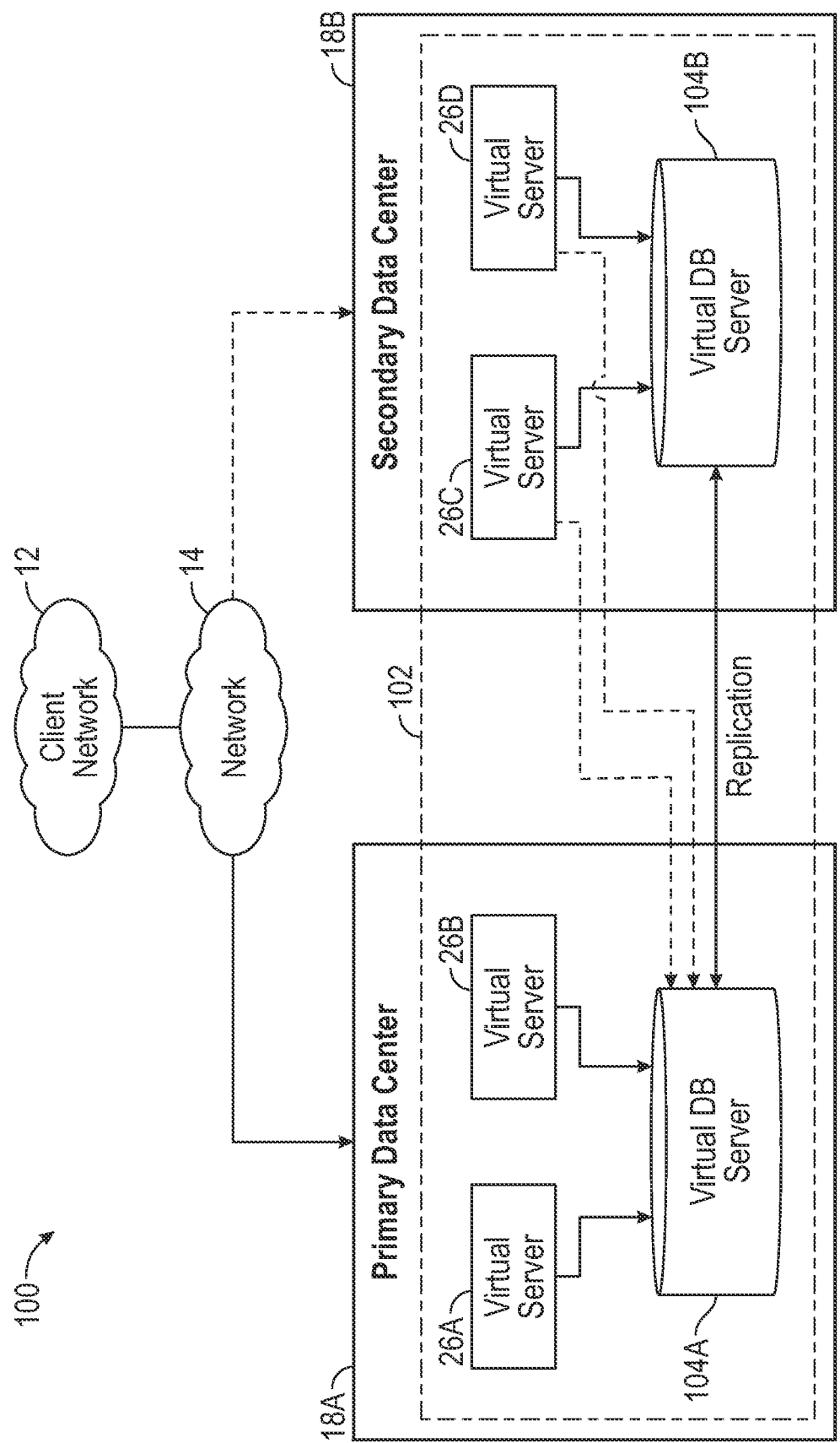
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
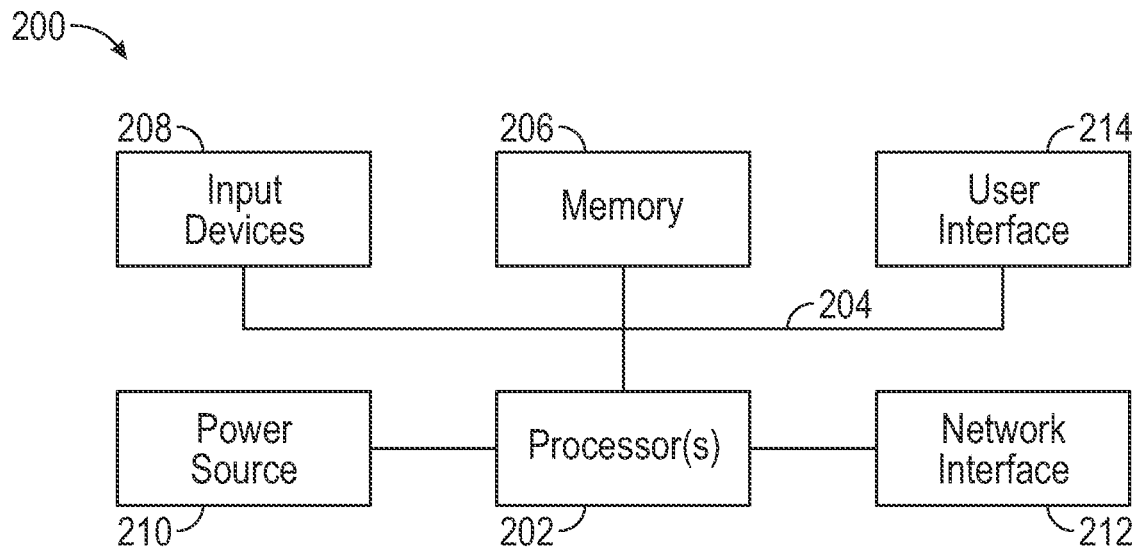
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
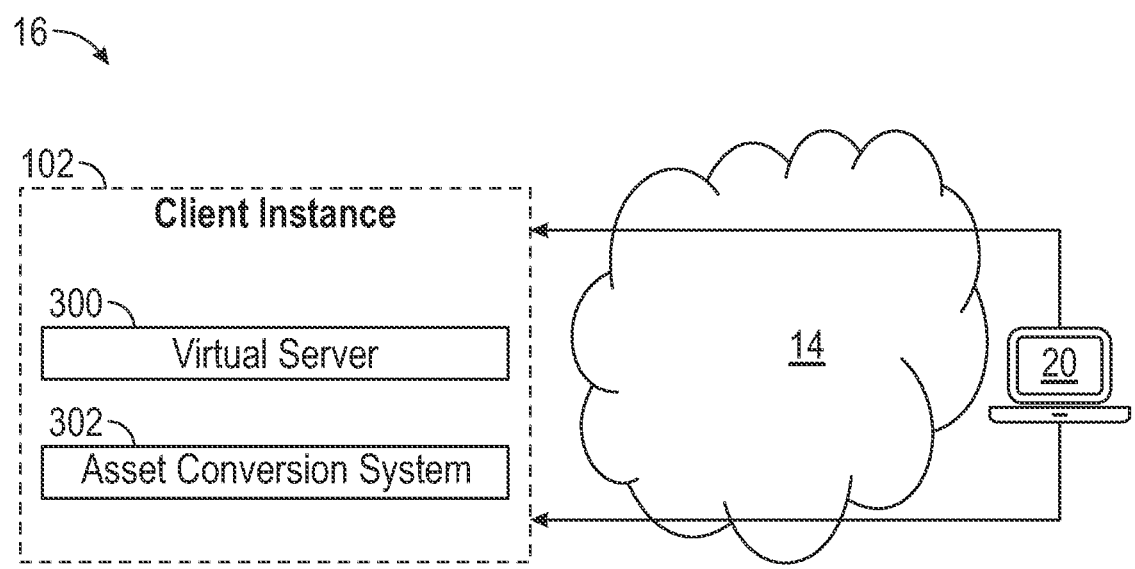
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above and as discussed herein, an end-user may also interface with client instance 102 using an application that is executed within a web browser.

The illustrated embodiment of the client instance includes an asset conversion system 302 that may manage resource requests received from the client device 20 associated with accessing resources such as webpages. In general, the asset conversion system 302 (e.g., asset conversion subsystem) may include generally similar features described in FIG. 3 with regards to the computing system 200, such as a processor 202 and memory 206 or may be implemented as a virtualization of such a server or computer system accessing such a processor 202 and memory 206 at an underlying hardware level.

Figure 5:
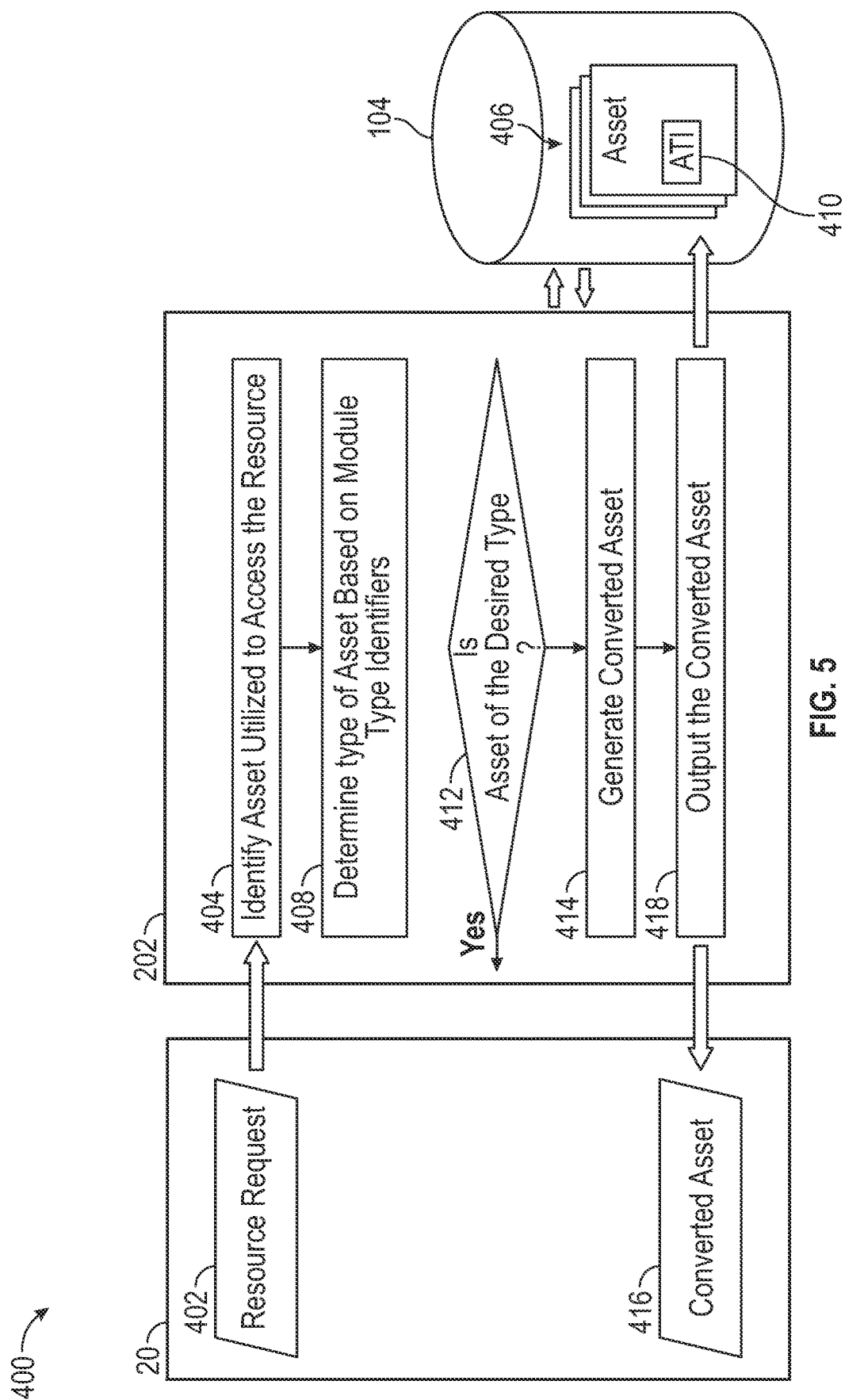
FIG. 5 is a flow diagram of an embodiment of a process to convert an asset from a first type to a second type based on asset identifiers indicating the asset corresponds to the first type, in accordance with aspects of the present disclosure.

As discussed herein, the asset conversion system 302 may improve the efficiency of operations associated with maintaining types, versions, and formats of one or more assets (e.g., modules or software modules) that are utilized for accessing resources (e.g., websites). For example, FIG. 5 is a flow diagram of an embodiment of a process 400 to generate a converted module (e.g., converted asset 416) based on a received request (e.g., resource request 402) for accessing a resource, such as one or more webpages. The steps illustrated in the process 400 are meant to facilitate explanation by providing a real-world context and are not intended to limit the scope of this disclosure. Indeed because additional steps than those shown may be performed, certain steps may be omitted, and/or the illustrated steps may be performed in an alternative order or in parallel, where appropriate. The process 400 may be implemented by a client device 20 or a device or server in communication with such a device 20. For example, the process 400 may be implemented by the asset conversion system 302 associated with a hardware server or virtual server of the client instance 102. For example, the process 400 may be implemented by a page processor associated with a web server in communication with the computing device 20. In some embodiments, the process 400 may be implemented using a processor of the data center 18 by way of the client device 20. For example, a processor of the client device 20 may interact with a processor of the datacenter using the network 14 and retrieve cached modules stored in a database (e.g., the database 104) in response to a request.

To start the process 400, a processor 202 (e.g., a page processor associated with a server, such as a webserver) may receive a resource request 402 indicating that a user device 20 is attempting to access a resource (e.g., a webpage). For example, the server may receive a request indicating that the user is attempting to access a webpage (e.g., a webpage request) via a browser executed by a computing device 20.

After receiving the resource request, at block 404, the processor 202 may identify the assets (e.g., software components or modules) used to run the resource. For example, in an embodiment where the resource request is to open a webpage, the processor 202 may identify modules that are used to render one or more portions (e.g., content) of the webpage. As discussed herein, the modules may include objects, functions, classes, or code that are executable by a processor 202. For example, the modules may include Common JavaScript (CJS) modules, Asynchronous Module Definition (AMD) modules, Universal Module Definition (UMD) modules, and ECMAScript modules (ESM). Put differently, the modules may have a type or format, such as AMD, CJS, UMD, or AMD.

In some embodiments, to identify the asset, the processor 202 may query assets 406 stored in a database 104 or in cache memory for the assets used to run the resource. For example, the processor 202 may query a cache memory to determine whether the assets used to run the resource are available. If the processor 202 determines that the cache memory does not store the resources, then the processor 202 may query a database, file system, or other storage device, 104 storing the assets 406, including the one or more used for running the resource. In any case, the processor 202 may retrieve the assets from the cache memory or the database 104.

After retrieving the asset, the processor 202, at block 408, may determine a type, version, or format of the retrieved asset. In the depicted example, the assets 406 include ATIs 410 that may be useful for determining the type, version, or format of the asset 406. In general, the processor 202 may identify ATIs, such as metadata of an asset (e.g., the retrieved asset) and use the metadata to determine information indicating the type, version, or format, such as global variables, times identifiers, messages, and functions. In some embodiments, the metadata may include information indicative of dependencies of a module patterns of characters. Accordingly, the processor 202 may determine a module is of a first type if it is dependent on modules of the first type. In some embodiments, the metadata may include strings that may indicate a format of the module (e.g., regular expressions associated with a module) and/or global variables that are specific to a type of asset. In some embodiments, the metadata may include user data that may indicate a particular user who worked on the module. Accordingly, the processor 202 may determine that an asset is a first type of module if the metadata indicates that a user, who typically works on modules of the first type, recently worked on or updated the module. In some embodiments, the metadata may include timestamps that may correlate to a particular version or type of module that a group of users worked on. In some embodiments, the metadata may include browser data indicating the browser for which the module is utilized.

In general, one or more of the examples of metadata provided above may be used as signals for determining the type of module. At least in some instances, the processor 202 may determine that one or more of the signals are correlated with a specific type of module. For example, the processor 202 may utilize a machine-learning (ML) component, such as an artificial neural network (ANN), support vector machines (SVM), a restricted Boltzmann machine, Bayesian networks, genetic algorithms, and the like, to determine correlations between the signals and the type of module.

As one non-limiting example of the process at block 408, the processor 202 may extract metadata from one or more assets by parsing and static analyzing its contents. The extracted metadata may be coupled with the asset when both are provisioned in the database. The parsing process may generate a data structure called Abstract Syntax Tree (AST). At least in some instances, the static analysis includes proprietary checks and rules that can be extended or amended over time to support new module formats. These checks may include, but are not limited to, import statements, export statements, function declarations and classes declarations. In any case, the AST may provide a representation of the syntax of a module that may be used by the processor 202 for determining the type, version, or format, of an asset.

After determining the type, version, or format of the asset, the processor 202, at block 412, may determine whether the type, version, or format of the retrieved asset corresponds to a desired type, version, or format. In general, the desired type, version, or format indicates a preference of the user for what modules should be used by web browsers. For example, a user may prefer or specify the use of ESM modules instead of UMD modules.

In some embodiments, to determine whether the modules are available in the desired format, the processor 202 may determine whether a particular webpage has been requested within a time threshold. In general, the time threshold may indicate a range before the module was updated or a typical timeframe at which the module may receive updates. For example, the processor 202 may identify a time identifier, such as a timestamp, associated with the module. For example, the time identifier may indicate that the webpage was previously accessed or requested within a time threshold such as 30 minutes, 1 hour, 5 hours, 24 hours, or 2 days before a time where the resource request 402 was generated or received. As such, the processor 202 may determine that the module is in a suitable format. In some embodiments, the time identifier may include an injected message, such as cache buster or a random string attached to the module. As such, if the processor 202 identifies the cache buster, the processor 202 may determine whether a time associated with the addition of the cache buster is greater than or less than the threshold time.

In some embodiments, the processor 202 may determine whether the ATIs correspond to the desired format by determining whether the ATIs are characteristic of the type or format. For example, it should be noted that functions or global variables may be particular to certain modules. As such, if the processor 202 determines that the identified ATIs, at block 404, correspond to characteristic ATIs, then the processor 202 may determine that the asset is of the desired asset type, format, or version.

In any case, if the processor 202 determines that the asset corresponds to the desired asset, such as the desired type, the desired format, or the desired version, the processor 202 may output the asset to the computing device 20 to provide access to the resource associated with the resource request. However, if the processor 202 determines that the asset is not of the desired type, version, or format, the process 400 may proceed to block 412 and generate a converted asset 416 (e.g., converted module). In general, the processor 202 may alter, modify, or adjust code associated with the asset such that the asset is in a suitable format and/or type. For example, the processor 202 may change certain characters from a first character type to a second character type, and/or change functions from a first function type to a second function type. In any case, after generating the converted asset 416, the processor 202 may output, at block 418, the converted module 416. For example, the processor 202 may output the converted asset 416 to be stored in a cache memory of the computing device 20. Additionally or alternatively, the processor 202 may cache the converted asset 416 in a memory or store the converted asset 416 in the database 104. In some embodiments, the processor 202 may retain the previous asset having the previous type, version, or format. In this way, the disclosed techniques provide a progressive rebuild of assets 406 (e.g., modules) used for accessing resources, thereby reducing an amount of resources that may be utilized in rebuilds. At least in some instances, the processor 202 may delete the previous asset.

Figure 6:
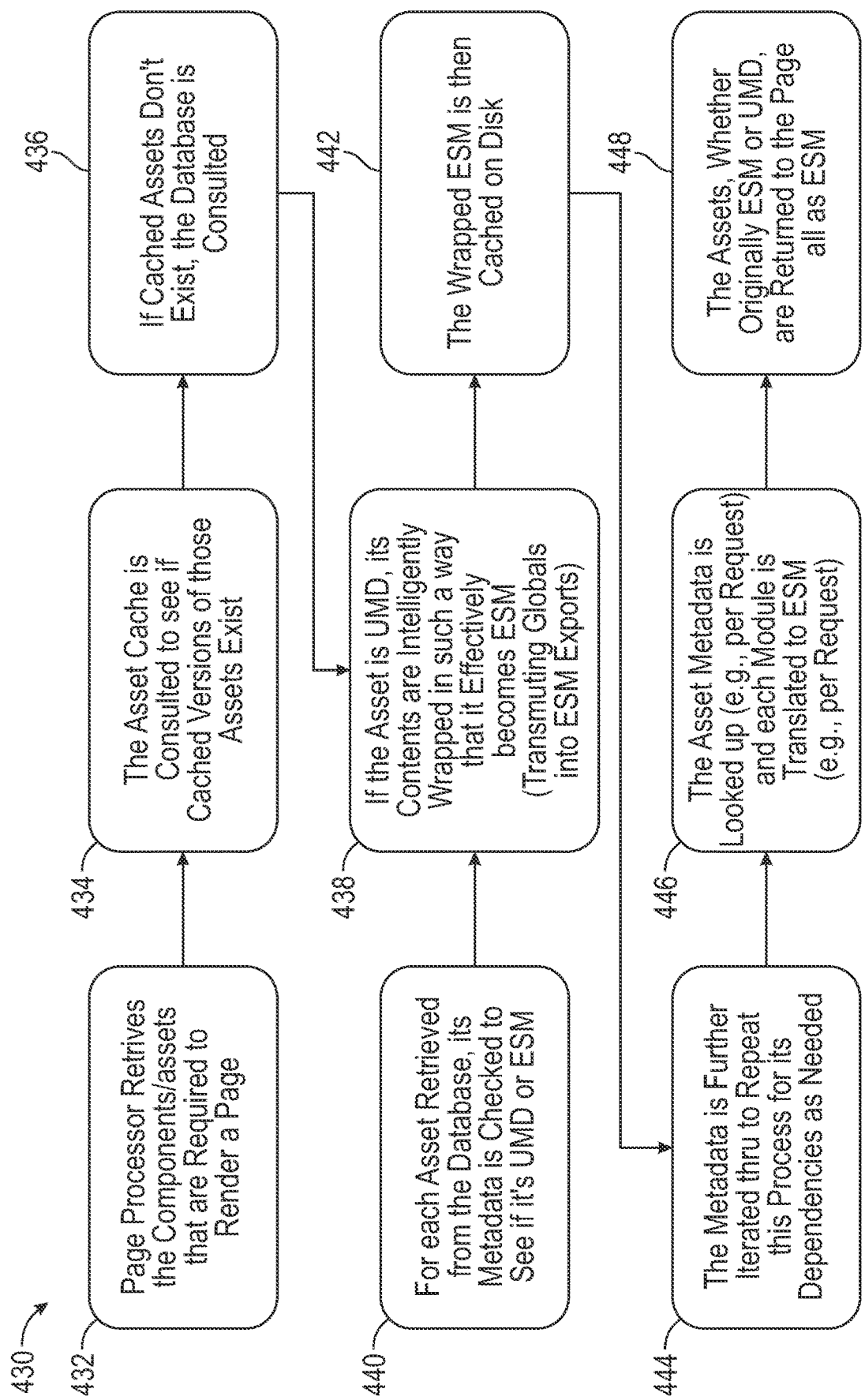
FIG. 6 is a flow diagram of an embodiment of a process to convert Universal Module Definition (UMD) modules to ECMAScript modules (ESM) based on a received request to access one or more webpages, in accordance with aspects of the present disclosure.

To illustrate a specific example of an embodiment of the disclosed techniques, FIG. 6 is a flow diagram of an embodiment of a process 430 to generate a converted ESM module based on a received request for accessing a webpage or website using a UMD module. The steps illustrated in the process 430 are meant to facilitate discussion and are not intended to limit the scope of this disclosure, because additional steps may be performed, certain steps may be omitted, and/or the illustrated steps may be performed in an alternative order or in parallel, where appropriate. The process 430 may be implemented by a client device 20 or a device or server in communication with such a device 20. In some embodiments, the process 400 may be implemented using a processor 202 of the data center 18 in response to interactions with the client device 20. For example, the processor 202 of the client device 20 may interact with the processor 202 of the datacenter using the network 14 and retrieve cached modules stored in a database (e.g., the database 104).

To start the process 430, at block 432, the processor 202 associated with a webserver retrieves components (e.g., modules) that are used to render a webpage. For example, the processor 202 may retrieve a module used to generate an image on the webpage. At block 504, the processor 202 may consult or query an asset cache (e.g., a module cache) to determine whether a cached version of the module used to render the webpage is stored in the asset cache. If the processor 202 determines that a cached version of the module exists, the process 430 may return to block 432 once an additional request that triggers block 432 is received.

However, if the processor 202 determines that the cached assets do not exist, the processor 202 may retrieve the components from a database at block 436. Then, at block 438, the processor 202 may determine whether each of the assets are a UMD module or an ESM module. For example, the processor 202 may, at block 440, check metadata (e.g., ATIs) to determine whether the assets are UMD modules or ESM modules. For each asset that is a UMD module, the processor 202 may convert the UMD modules to ESM modules and the ESM modules are cached on disk (e.g., of the computing device 20 accessing the webpage), at block 442. In some embodiments, the metadata of the assets may be further iterated through for other assets that may depend on the converted UMD module (e.g., presently an ESM module), at block 444. At block 446, the processor 202 may look up the asset metadata per request and each module may be translated to ESM per the request. In any case, the assets, converted UMD modules or ESM modules are returned and utilized by the computing device to access the webpage at block 448.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions, which, when executed by a processor, cause the processor to perform acts comprising:
   receiving a request to access a webpage from a computing device;
   identifying an asset used to provide access to the webpage based on the request, wherein the asset corresponds to a software module that is separate from the webpage;
   determining that the asset comprises a universal module definition (UMD) module based on one or more identifiers associated with the asset; and
   converting the asset to generate a converted asset, wherein the converted asset comprises an ECMAScript module (ESM) different than the UMD module.

2. The machine-readable medium of claim 1, wherein converting the asset to generate the converted asset comprises altering the one or more identifiers to generate one or more replacement identifiers characteristic of the ESM.

3. The machine-readable medium of claim 1, wherein the one or more identifiers comprise global variables.

4. The machine-readable medium of claim 1, further comprising machine-readable instructions, which, when executed by the processor, cause the processor to perform further acts comprising:
   storing the converted asset in a cache memory associated with the computing device.

5. The machine-readable medium of claim 1, wherein determining that the asset comprises the UMD module comprises determining whether the asset is stored on a cache memory of the computing device.

6. The machine-readable medium of claim 5, further comprising machine-readable instructions, which, when executed by the processor, cause the processor to perform further acts comprising:
   retrieving the asset from a database in response to determining the cache memory does not include the asset.

7. The machine-readable medium of claim 1, wherein the one or more identifiers comprise time based identifiers generated by a cache buster.

8. The machine-readable medium of claim 1, wherein determining that the asset comprises the UMD module comprises determining whether the computing device previously accessed the webpage.

9. A system comprising:
   an asset conversion subsystem coupled to an instance hosted by a cloud service platform and a client device, wherein the asset conversion subsystem, the instance, and the client device are coupled to a network, and wherein the asset conversion subsystem is configured to:
   receive a request to access a webpage from the client device;
   identify one or more modules stored in a cache memory of the client device that comprise a universal module definition (UMD) module based on one or more identifiers associated with the one or more modules, wherein the one or more modules are configured to provide the client device access to the webpage, and wherein the one or more modules are separate from the webpage; and
   convert the one or more modules to generate a converted module, wherein the converted module comprises an ECMAScript module (ESM).

10. The system of claim 9, wherein the one or more identifiers indicate a previous time the webpage was accessed; and
   wherein the asset conversion subsystem is configured to determine that the one or more modules comprise the universal module definition (UMD) module based on the one or more identifiers associated with the one or more modules by determining the previous time is within a threshold time range.

11. The system of claim 9, wherein the asset conversion subsystem is configured to convert the one or more modules to generate the converted module by outputting an updated version of the one or more modules to replace the one or more modules on the cache memory.

12. The system of claim 9, wherein the asset conversion subsystem is configured to convert the one or more modules to generate the converted module after determining that the one or more identifiers are characteristic of the UMD module.

13. The system of claim 9, wherein the asset conversion subsystem comprises a page processor.

14. The system of claim 9, wherein the one or more identifiers comprise global variables.

15. The system of claim 9, wherein the one or more identifiers comprise time based identifiers generated by a cache buster.

16. A method, comprising:
   receiving a request to access a webpage via a computing device;
   querying a database storing modules configured to provide access to the webpage;
   identifying a first module configured to render the webpage based on the request, wherein the first module is separate from the webpage;
   determining that the first module comprises a universal module definition (UMD) module; and
   generating a second module using the first module, wherein the second module is an ECMAScript module (ESM).

17. The method of claim 16, comprising determining that the first module comprises the UMD module based on time-based identifiers injected by a cache buster that are present within the first module.

18. The method of claim 16, comprising generating the second module by replacing one or more portions of the first module with one or more replacement portions, wherein the one or more portions are identifiers characteristic of the UMD module and the one or more replacement portions are identifiers characteristic of the ESM.

19. The method of claim 16, comprising storing the second module in the database.

20. The method of claim 16, comprising outputting the second module to the computing device.

* * * * *